United States Patent
Cong et al.

(10) Patent No.: US 11,306,767 B2
(45) Date of Patent: Apr. 19, 2022

(54) METHOD FOR CONNECTING ROD

(71) Applicants: TIANRUN CRANKSHAFT CO., LTD., Shandong (CN); SHANDONG UNIVERSITY OF TECHNOLOGY, Shandong (CN)

(72) Inventors: Jianchen Cong, Shandong (CN); Shijie Lv, Shandong (CN); Meizhen Feng, Shandong (CN); Yuping Hu, Shandong (CN)

(73) Assignees: Tianrun Industry Technology Co., Ltd., Weihai (CN); SHANDONG UNIVERSITY OF TECHNOLOGY, Zibo (CN)

( * ) Notice: Subject to any disclaimer, the term of this patent is extended or adjusted under 35 U.S.C. 154(b) by 118 days.

(21) Appl. No.: 16/833,858

(22) Filed: Mar. 30, 2020

(65) Prior Publication Data

US 2021/0003168 A1    Jan. 7, 2021

(30) Foreign Application Priority Data

Jul. 4, 2019   (CN) .......................... 201910602476.5

(51) Int. Cl.
*F16C 7/00*    (2006.01)
*F16C 7/08*    (2006.01)

(52) U.S. Cl.
CPC ............ *F16C 7/08* (2013.01); *B23P 2700/04* (2013.01); *Y10T 29/4998* (2015.01); *Y10T 29/49288* (2015.01); *Y10T 29/49291* (2015.01); *Y10T 29/49758* (2015.01)

(58) Field of Classification Search
CPC .... F16C 7/08; F16C 2240/60; F16C 2204/60; F16C 7/023; Y10T 29/49758; Y10T 29/4998; Y10T 29/49291; Y10T 29/49288; B23P 2700/04
USPC ....................................................... 29/889.09
See application file for complete search history.

(56) References Cited

U.S. PATENT DOCUMENTS

| | | | | |
|---|---|---|---|---|
| 4,970,783 | A | * 11/1990 | Olaniran | ............... B23D 31/003 29/413 |
| 2003/0051776 | A1 | * 3/2003 | Enya | ........................ C22C 37/10 148/321 |
| 2015/0053363 | A1 | * 2/2015 | Jiang | ........................ F16C 9/045 164/95 |

(Continued)

FOREIGN PATENT DOCUMENTS

| CN | 104633028 A | 5/2015 |
|---|---|---|
| CN | 106392012 A | 2/2017 |

*Primary Examiner* — Sarang Afzali
*Assistant Examiner* — Darrell C Ford

(57) ABSTRACT

The invention provides a design method for a connecting rod. The connecting rod includes a first end, a shank and a second end; and the shank is connected between the first end and the second end. The design method includes: determining a weight $m_1$ of a standard steel connecting rod; determining a weight $m_2$ of a nodular cast iron connecting rod having the same size with the standard steel connecting rod; and simulating to reinforce the shank with a reinforcement material having a preset weight m, and calculating a size of the reinforced shank; where $m_1 > m_2$, and $m < m_1 - m_2$. The present invention overcomes the technical problem that existing steel connecting rods have larger weights.

4 Claims, 2 Drawing Sheets

(56) References Cited

U.S. PATENT DOCUMENTS

2016/0265580 A1* 9/2016 Elie .................. B22D 19/02
2018/0216658 A1* 8/2018 Brown ................ F16C 7/023

* cited by examiner

METHOD FOR CONNECTING ROD

CROSS-REFERENCE TO RELATED APPLICATIONS

This application claims the benefit of priority from Chinese Patent Application No. 201910602476.5, filed on Jul. 4, 2019. The content of the aforementioned application, including any intervening amendments thereto, is incorporated herein by reference in its entirety.

TECHNICAL FIELD

This application relates to design of connecting rods, and more particularly to a design method for a connecting rod.

BACKGROUND OF THE INVENTION

A connecting rod, consisting of a small end, a big end and a shank of the connecting rod, is one of the core parts of an internal combustion engine. The connecting rod connects a piston and a crankshaft, and converts a reciprocating motion of the piston to a rotating motion of the crankshaft. Because of the gas pressure on the top of the piston and the inertia force, the connecting rod bears alternating loads such as compression, tension and bending during working. Therefore, the connecting rod requires high strength and stiffness, and preferably it should be lightweight. To ensure the operational reliability, currently, the connecting rods of internal combustion engines mostly are made of high-performance alloy steels. However, the high-performance alloy steel has a higher price and a higher density, leading to higher production cost and a larger weight, and larger inertia of the connecting rod is generated, which is not conducive to reducing the energy consumption of the internal combustion engine.

SUMMARY OF THE INVENTION

An object of the invention is to provide a design method for a connecting rod to solve the technical problem that the existing steel connecting rods have larger weights.

The invention provides a design method for a connecting rod, said connecting rod comprising a first end, a shank and a second end; the shank being connected between the first end and the second end; wherein the design method comprises:

determining a weight $m_1$ of a standard steel connecting rod;

determining a weight $m_2$ of a nodular cast iron connecting rod having the same size with the standard steel connecting rod; and simulating to reinforce the shank with a reinforcement material having a preset weight m, and calculating a size of the reinforced shank;

wherein $m_1 > m_2$, and $m < m_1 - m_2$.

In some embodiments, a groove is provided on the shank, and the reinforcement material is added to a bottom of the groove to reduce a depth D of the groove.

In some embodiments, the design method further comprises:

calculating a reinforcing thickness H for the shank according to the following equation:

$$H = K \times \frac{m_1 - m_2}{p \cdot S};$$

wherein p is the density of nodular cast iron, $kg/m^3$; S is the cross-sectional area of the groove, $m^2$; K is the constant of proportionality ranging from 0.9 to 1.

In some embodiments, the cross-sectional area of the groove is a cross-sectional area at ⅓-½ of the depth D of the groove.

In some embodiments, the design method further comprises:

manufacturing the reinforced nodular cast iron connecting rod based on the reinforcing thickness H;

testing and calculating stiffness of the reinforced nodular cast iron connecting rod; and if the stiffness of the nodular cast iron connecting rod is less than a preset stiffness, increasing the constant of proportionality to recalculate the reinforcing thickness H.

In some embodiments, the design method further comprises:

calculating the preset weight m according to the reinforcing thickness H, the density of nodular cast iron and the cross-sectional area of the groove.

In some embodiments, the design method further comprises:

calculating a design weight of the reinforced nodular cast iron connecting rod according to the following equation:

$$M = m + p \cdot V;$$

wherein M is the design weight of the reinforced nodular cast iron connecting rod, kg; and V is the volume of the standard steel connecting rod, $m^3$.

In some embodiments, the design method further comprises:

comparing the design weight M of the reinforced nodular cast iron connecting rod with a preset weight M' of the reinforced nodular cast iron connecting rod;

if $M \leq M'$, determining that the design weight M of the reinforced nodular cast iron connecting rod is qualified; and if $M > M'$, reducing the proportionality coefficient to recalculate the reinforcing thickness H.

In some embodiments, the design method further comprises:

calculating a difference between the preset weight M' and the design weight M of the reinforced nodular cast iron connecting rod; and If the difference is less than a preset difference, determining the reinforced nodular cast iron connecting rod is qualified.

In some embodiments, the design method further comprises:

testing and calculating structural strength of the reinforced nodular cast iron connecting rod; and if the structural strength of the reinforced nodular cast iron connecting rod is less than preset structural strength of the reinforced nodular cast iron connecting rod, increasing the constant of proportionality to recalculate the reinforcing thickness H.

The invention has the following beneficial effects.

The connecting rod comprises the first end, the shank and the second end; the shank is connected between the first end and the second end. The design method comprises: determining a weight $m_1$ of a standard steel connecting rod; determining a weight $m_2$ of a nodular cast iron connecting rod having the same size with the standard steel connecting rod; simulating to reinforce the shank with a reinforcement material of a preset weight m, and calculating a size of the reinforced shank; wherein $m_1 > m_2$, and $m < m_1 - m_2$; calculating a weight difference between the standard steel connecting rod and the nodular cast iron connecting rod; reinforcing the shank with a reinforcement material of a preset weight m, which is less than the weight difference, to obtain a design size of the reinforced nodular cast iron connecting rod which is made of nodular cast iron and has a weight which is smaller than the weight $m_1$ of the standard steel connecting rod.

The invention will be illustrated with reference to the accompanying drawings and preferred embodiments, from which the object, characteristics and advantages of the invention are clearer and more understandable.

BRIEF DESCRIPTION OF THE DRAWINGS

The specific embodiments and technical solutions of the invention are illustrated with reference to the accompanying drawings. It is obvious that the following drawings merely show some preferred embodiments. Other drawings can be obtained by those skilled in the art without paying any creative effort.

Figure 1:
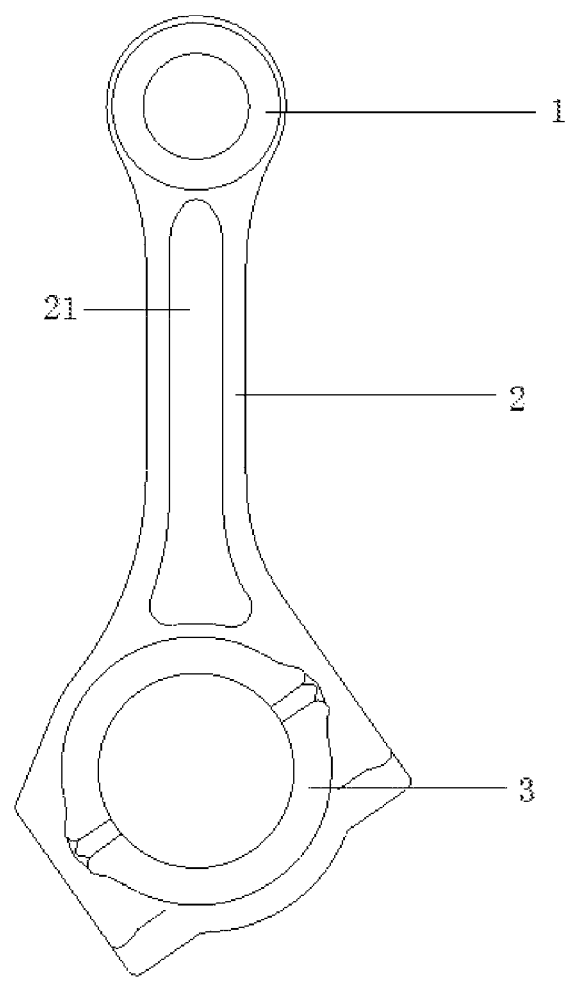
FIG. 1 is a schematic diagram of a connecting rod using a design method according to an embodiment of the present invention.

In the drawings, 1—first end, 2—shank, 21—groove, 3—second end.

DETAILED DESCRIPTION OF EMBODIMENTS

The technical solutions of the embodiments of the present invention will be clearly and completely described with reference to the accompanying drawings. Obviously, described above are merely preferred embodiments of the invention, and are not intended to limit the invention. Any other embodiments made by those skilled in the art without paying any creative effort should fall within the scope of the invention.

In the description of the invention, it should be noted that directional terms such as "center", "up", "down", "left", "right", "vertical", "horizontal", "in" and "out" are based on the drawings, which are merely for illustration of the invention and are not intended to indicate specific positions, structures or operations of the devices or components, therefore are not intended to limit the scope of the invention. Moreover, terms such as "first", "second" and "third" are merely for description, and are not intended to indicate the relative importance. The physical quantities in the equations, unless separately labeled, should be interpreted as basic quantities with basic units of the International System of Units, or derived quantities from the basic quantities through mathematical operations such as multiplication, division, differentiation or integration.

In the present invention, it should be noted that unless specified, terms "provide", "communicate" and "connect" should be understood broadly. For example, "fix" may result in a fixed connection, a detachable connection, or an integrated configuration of elements. The elements may be connected mechanically or electrically; or directly connected or indirectly connected through an intermediate medium. Alternatively, two elements may be in communication or interact with each other unless specified. For the skilled in the art, the specific meanings of the above terms in the present invention can be understood according to specific conditions.

Embodiment 1

As shown in FIG. 1, the invention provides a design method for a connecting rod, where the connecting rod includes a first end 1, a shank 2 and a second end 3; and the shank 2 is connected between the first end 1 and the second end 2. The design method includes the following steps. A weight $m_1$ of a standard steel connecting rod is determined; a weight $m_2$ of a nodular cast iron connecting rod is determined, where the size of the nodular cast iron connecting rod is the same as the size of the standard steel connecting rod; and the shank 2 is simulated to be reinforced with a reinforcement material having a preset weight m, and a size of the shank 2 is calculated, where m $m_1 > m_2$, and $m < m_1 - m_2$.

Specifically, the weight $m_1$ of the standard steel connecting rod is larger than the weight $m_2$ of the nodular cast iron connecting rod having the same size with the standard steel connecting rod. According to a difference between $m_1$ and $m_2$, the reinforcement material of a preset weight m is selected to reinforce the shank 2, such that a cross-sectional area of the shank 2 is increased, that is, a thickness of the shank 2 is increased, and $m < m_1 - m_2$. Therefore, the reinforced connecting rod has a smaller weight than the weight $m_1$ of the standard steel connecting rod. Moreover, compared with steel, the reinforced nodular cast iron has better abrasive resistance and damping performance, so that the insufficient stiffness of the nodular cast iron connecting rod can be reinforced by increasing the cross-sectional area of the shank of the nodular cast iron connecting rod. And then, under the condition of using nodular cast iron as the production material, compared with the standard steel connecting rod, the redesigned shank 2 obtains approximate stiffness, a smaller weight and larger strength. Since nodular cast iron has better machinability and lower price than steel, the nodular cast iron connecting rod designed according to the design method in the present invention can greatly reduce the production cost of connecting rods.

It should be noted that in the step of reinforcing the shank 2 with a reinforcement material of a preset weight m, the reinforcement material can be alloy steel, which is plated on a surface of the shank 2 to increase the thickness of the shank 2 and further improve the stiffness and strength of the shank 2. Preferably, the reinforcement material is nodular cast iron. The volume of nodular cast iron of the preset weight m is calculated according to the density of nodular cast iron. And the reinforcing thickness is calculated according to the volume of the nodular cast iron and a surface area of the shank 2, so that the design size of the shank 2 is calculated. According to the design size of the shank 2, a nodular cast iron connecting rod of a weight of $m+m_2$ is produced by casting, obtaining a reinforced nodular cast iron connecting rod which has a smaller weight and higher strength than the standard steel connecting rod, and has approximately the same stiffness with the steel connecting rod. The simulated reinforcement for the shank 2 herein is not actually casted or plated by a nodular cast iron material, but is proceeded by determining a reinforcement area on the shank 2, calculating the reinforcement thickness of the nodular cast iron to obtain the design size of the shank 2 of the reinforced nodular cast iron connecting rod.

The design method provided in the invention is especially applicable when a design size of the standard steel connecting rod is known. Based on the design size of the standard steel connecting rod, according to a weight difference between the standard steel connecting rod and the nodular cast iron connecting rod with the same size, a reinforced nodular cast iron connecting rod is obtained, which is lighter and has higher strength than the standard steel connecting rod, and has approximately the same stiffness with the standard steel connecting rod. Therefore, on the basis of the standard steel connecting rod, it is possible to develop a nodular cast iron connecting rod of the same-typed engine, which simplifies the steps to design the size of connecting rods, thereby shortening the design cycle of nodular cast iron connecting rods.

Figure 2:
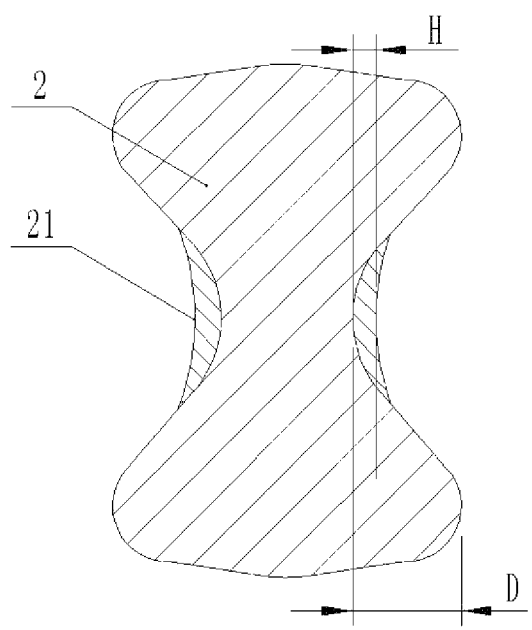
FIG. 2 is a cross-sectional view of a shank of the connecting rod using the design method according to the embodiment of the present invention.

As shown in FIGS. 1 and 2, in some embodiments, a groove 21 is provided on the shank 2, and the shank 2 is reinforced with the reinforcement material to reduce the depth D of the groove 21. The shank 2 can be I-shaped, that is, both sides of the shank 2 each are provided with the groove 21. The shank 2 is simulated to be reinforced with the reinforcement material to a bottom of the groove 21 to reduce a depth D of the groove 21, such that the design size of the shank 2 of the reinforced nodular cast iron connecting rod is obtained. Due to the reducing of the depth D of the groove 21, a cross-sectional area of the shank 2 is increased, so the structural strength and stiffness of the shank 2 is further increased. In addition, the added reinforcement material is located in the groove 21, therefore there is no influence on an outer size of the shank 2, avoiding that the shank 2 occupies more space.

In some embodiments, the design method further includes the following steps.

A reinforcing thickness H for the shank 2 is calculated according to the following equation:

$$H = K \times \frac{m_1 - m_2}{p \cdot S};$$

where the unit of H is m; p is the density of the nodular cast iron, kg/m$^3$; S is the cross-sectional area of the groove 21, m$^2$; K is the constant of proportionality ranging from 0.9 to 1.

Specifically, when a section of the groove 21 is a rectangle, the cross-sectional area of the groove 21 is the bottom area of the groove 21. According to the difference between the weight $m_1$ of the standard steel connecting rod and the weight $m_2$ of the nodular cast iron connecting rod having the same size with the standard steel connecting rod, a preset weight m, less than the difference, is used to be the weight of reinforcing nodular cast iron, and the volume thereof is calculated according to the density of the nodular cast iron. According to the volume of the reinforcing nodular cast iron and the cross-sectional area of the groove 21, the reinforcing thickness H is calculated. By multiplying the reinforcing thickness H by the constant of proportionality, an actual usage of nodular cast iron can be further reduced while meeting the requirements for strength and stiffness, thereby further reducing the weight of the nodular cast iron connecting rod.

In some embodiments, the cross-sectional area of the groove 21 is a cross-sectional area at ⅓-½ of the depth D of the groove 21. Generally, connecting rods are produced by casting, so the bottom of the groove 21 is mostly arc since it is limited by the production technique. Therefore, the cross-sectional area at ⅓-½ of the depth of the groove 21 is selected as an approximately average cross-sectional area of the groove 21.

In some embodiments, the design method further includes the following steps.

A trial production for the reinforced nodular cast iron connecting rod is carried out according to the reinforcing thickness H. The stiffness of the reinforced nodular cast iron connecting rod is tested and calculated; and if the stiffness of the reinforced nodular cast iron connecting rod is less than preset stiffness, the constant of proportionality is increased to recalculate the reinforcing thickness H. The stiffness analysis for the reinforced nodular cast iron connecting rod is carried out by methods such as theoretic calculation, experimental measurement and finite element analysis. If the stiffness of the reinforced nodular cast iron connecting rod is equal to or larger than the preset stiffness, the stiffness of the reinforced nodular cast iron connecting rod is qualified to the design requirement; if not, the constant of proportionality is increased to increase the reinforcing thickness H to obtain the reinforced nodular cast iron connecting rod with larger stiffness, and the stiffness of the reinforced nodular cast iron connecting rod is retested to verify whether the design requirement is met.

In some embodiments, the design method further includes: calculating the preset weight m according to the reinforcing thickness H, the density of the nodular cast iron and the cross-sectional area of the groove 21. The approximate volume of reinforcing nodular cast iron can be obtained by multiplying the reinforcing thickness H by the cross-sectional area of the groove 21, and the preset weight m can be calculated by multiplying the density of the nodular cast iron by the volume of the reinforcing nodular cast iron. A design weight of the reinforced nodular cast iron connecting rod is a sum of the preset weight m and the weight $m_2$ of the nodular cast iron connecting rod.

In some embodiments, the design method further includes: calculating a design weight of the reinforced nodular cast iron connecting rod according to the following equation:

$$M = m + p \cdot V;$$

where M is the design weight of the reinforced nodular cast iron connecting rod, kg; and V is a volume of the standard steel connecting rod, m$^3$. The reinforced nodular cast iron connecting rod is produced by casting according to the calculated design weight of the reinforced nodular cast iron connecting rod.

In some embodiments, the design method further includes the following steps.

The design weight M of the reinforced nodular cast iron connecting rod is compared with a preset weight M' of the reinforced nodular cast iron connecting rod; if M≤M', a design weight of the reinforced nodular cast iron connecting rod is determined to be qualified; and if M>M', the constant of proportionality is reduced to recalculate the reinforcing thickness H. The preset weight M' is artificially set and is less than the weight m of the standard steel connecting rod. The reinforced nodular cast iron connecting rod can be lighter by improving the design requirement to the design weight M of the reinforced nodular cast iron connecting rod, which can reduce the power loss of engines and improve the working performance of engines using nodular cast iron connecting rods.

In some embodiments, the design method further includes calculating a difference between the preset weight M' and the design weight M of the reinforced nodular cast iron connecting rod. When the difference is less than a preset weight difference, the reinforced nodular cast iron connecting rod is determined to be qualified. Specifically, to make sure that the nodular cast iron connecting rod is applicable for the same-typed engine using the standard steel connecting rod, the design weight M of the reinforced nodular cast iron connecting rod should be matched with the engine power. Therefore, the preset weight M' is artificially set to be applicable for the engine, and ensure that the difference between the preset weight M' and the design weight M of the reinforced nodular cast iron connecting rod is less than the preset weight difference, such that the reinforced nodular cast iron connecting rod is applicable for the same-typed engine using the standard steel connecting rod.

In some embodiments, the design method further includes: testing and calculating the structural strength of the reinforced nodular cast iron connecting rod. If the structural strength of the reinforced nodular cast iron connecting rod is less than preset structural strength of the reinforced nodular cast iron connecting rod, the constant of proportionality is increased to recalculate the reinforcing thickness H. Specifically, the nodular cast iron connecting rod added with the reinforcing thickness H generally has larger structural strength than the standard steel connecting rod. The preset structural strength can be set to be more than or equal to the structural strength of the standard steel connecting rod. If the structural strength of the reinforced nodular cast iron connecting rod is much larger than the preset structural strength, the constant of proportionality can be reduced in the case that the stiffness requirement is satisfied to recalculate the reinforcing thickness H, obtaining a new design size of the reinforced nodular cast iron connecting rod.

It should be noted that the embodiments described above are merely intended to describe the technical solutions of the invention, and are not intended to limit the invention. Any modifications and equivalent replacements made by those skilled in the art without departing from the spirit of the invention should fall within the scope of the invention.

What is claimed is:

1. A method for reinforcing a nodular cast iron connecting rod, the method comprising:
    determining a weight $m_1$, having units kg, of a standard steel connecting rod;
    preparing the nodular cast iron connecting rod having the same size with the standard steel connecting rod and comprising a first end, a second end and a shank provided between the first end and the second end, a second end and a shank provided between the first end and the second end, wherein the shank of the nodular cast iron connecting rod is provided with a groove;
    determining a weight $m_2$, having units kg, of the nodular cast iron connecting rod;
    simulating to reinforce the shank with a reinforcement material having a weight m, having units kg, through adding the reinforcement material to a bottom of a groove of the nodular cast iron connecting rod to reduce a depth D of the groove;
    calculating a reinforcing thickness H, having units m, for the shank of the nodular cast iron connecting rod according to the following equation:

$$H = K \times \frac{m_1 - m_2}{p \cdot S}$$

wherein p is a density of the nodular cast iron having units $kg/m^3$; S is a cross-sectional area of the groove having units $m^2$; and K is a constant of proportionality ranging from 0.9 to 1;
    calculating a size of a reinforced shank;
    manufacturing a reinforced nodular cast iron connecting rod based on the size of the reinforced shank; and
    testing and calculating stiffness of the reinforced nodular cast iron connecting rod;
    when the stiffness of the reinforced nodular cast iron connecting rod is less than a preset stiffness, increasing the constant of proportionality K to recalculate the reinforcing thickness H; and
    when the stiffness of the reinforced nodular cast iron connecting rod is equal to or larger than the preset stiffness, indicating the stiffness of the reinforced nodular cast iron connecting rod is qualified.

2. The method of claim 1, wherein the cross-sectional area of the groove is a cross-sectional area at ⅓-½ of the depth D of the groove.

3. The method of claim 1, further comprising:
    calculating a design weight of the reinforced nodular cast iron connecting rod according to the following equation:

$$M = m + p \cdot V;$$

wherein M is the design weight of the reinforced nodular cast iron connecting rod, having units k; and V is the volume of the standard steel connecting rod, having units $m^3$.

4. The design method of claim 3, further comprising:
    comparing the design weight M of the reinforced nodular cast iron connecting rod with a preset weight M' of the reinforced nodular cast iron connecting rod;
    when M≤M', determining that the design weight M of the reinforced nodular cast iron connecting rod is qualified; and
    when M>M', reducing the proportionality coefficient to recalculate the reinforcing thickness H.

* * * * *

UNITED STATES PATENT AND TRADEMARK OFFICE
CERTIFICATE OF CORRECTION

| | | |
|---|---|---|
| PATENT NO. | : 11,306,767 B2 | Page 1 of 1 |
| APPLICATION NO. | : 16/833858 | |
| DATED | : April 19, 2022 | |
| INVENTOR(S) | : Jianchen Cong et al. | |

It is certified that error appears in the above-identified patent and that said Letters Patent is hereby corrected as shown below:

On the Title Page

Item (54) Title of invention and in the Specification, Column 1, Line 1, correct title should be:
DESIGN METHOD FOR CONNECTING ROD Signed and Sealed this
Seventh Day of June, 2022

Katherine Kelly Vidal
*Director of the United States Patent and Trademark Office*